July 17, 1934.  H. D. GEYER  1,967,088
SELF LUBRICATED SPRING FOR AUTOMOBILES
Filed Jan. 3, 1933  2 Sheets-Sheet 1
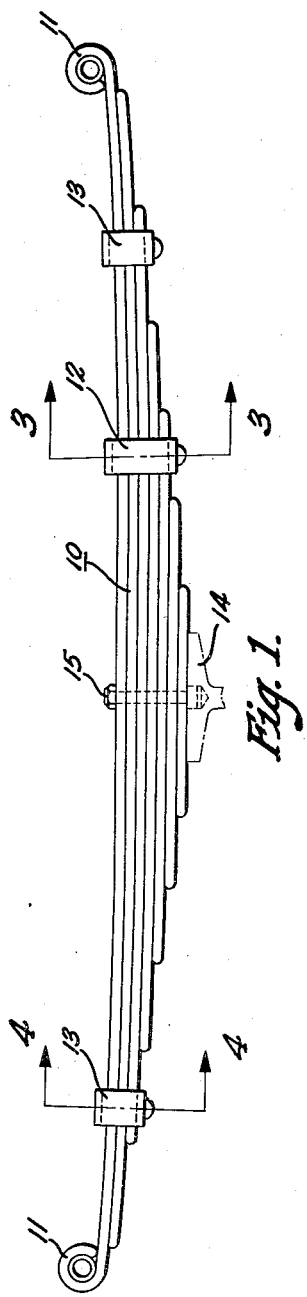
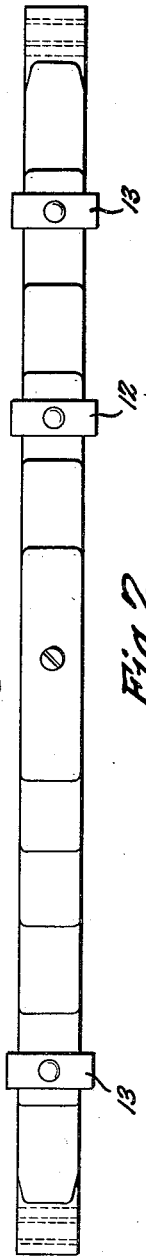
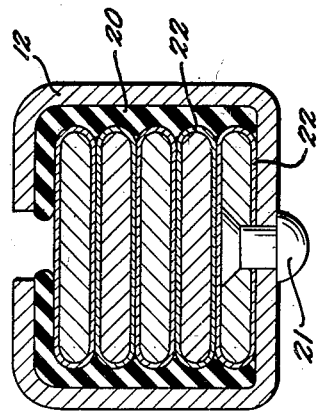
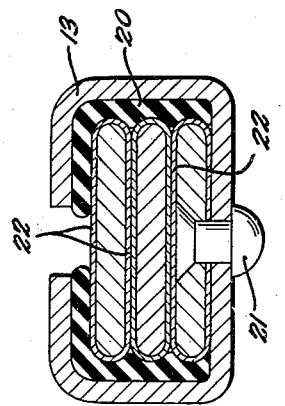
INVENTOR
*Harvey D. Geyer*
BY
*Spencer Hardman & Fehr*
his ATTORNEYS July 17, 1934. H. D. GEYER 1,967,088
SELF LUBRICATED SPRING FOR AUTOMOBILES
Filed Jan. 3, 1933  2 Sheets-Sheet 2
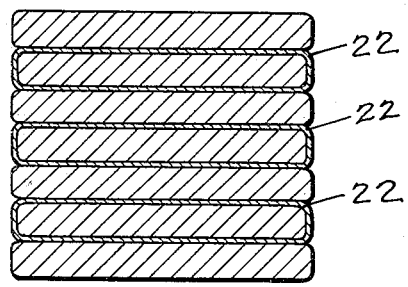
Fig. 5.
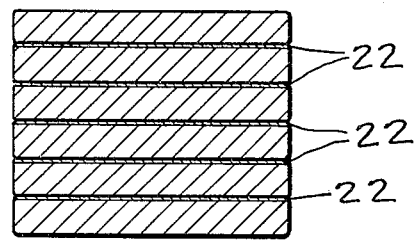
Fig. 6.
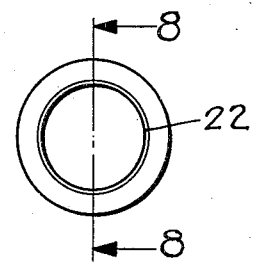 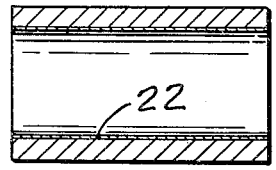
Fig. 7.  Fig. 8.
INVENTOR
Harvey D. Geyer
BY
Spencer Hardman & Feh
his ATTORNEYS Patented July 17, 1934

1,967,088

UNITED STATES PATENT OFFICE 1,967,088

SELF-LUBRICATED SPRING FOR AUTOMOBILES

Harvey D. Geyer, Dayton, Ohio, assignor, by mesne assignments, to General Motors Corporation, Detroit, Mich., a corporation of Delaware Application January 3, 1933, Serial No. 649,929

18 Claims. (Cl. 267—47)

This invention relates to a wear-resisting dry solid lubricating compound which is adapted to be bonded or otherwise fixed to a metal or other surface and provide a rust-preventing substantially permanent lubricating coating thereon.

One object of this invention is to provide a solid substantially permanent lubricating coating upon the contacting surfaces of the leaves of a multiple leaf spring before said leaves are assembled, whereby said leaf spring is permanently and efficiently lubricated. An important advantage of this invention as applied to automobile leaf springs lies in the fact that the degree of lubrication of the spring remains substantially constant over long periods of use, and hence variation in the spring characteristics due to variation in friction between the leaves is avoided. This feature is especially advantageous when the automobile is equipped with present day hydraulic shock absorbers since it permits the shock absorbers to be adjusted to give the best results for a long period of use.

Also with the lubricant coating of this invention the leaf springs of an automobile require no periodic application of lubricant and remain clean and neat appearing at all times and free from rust and dirt.

Also since no grease or oil need be used on the leaf spring, the metal clips which retain the separate leaves in proper alignment may be efficiently isolated from the leaves with resilient rubber for the purpose of providing a more free and squeakless relative movement between said leaves and the retaining clips. The lubricant coating of this invention will not deteriorate resilient rubber as will grease or oil.

Another object of this invention is to provide a simple and economical method of making a substantially permanently lubricated multiple leaf spring. Since the leaves are individually coated with the permanent lubricant coating prior to assembly, the coating may easily be made any desired thickness on the friction surfaces of the leaves, and this coating may be thoroughly hardened by drying, or baking at any desired temperature, to provide the proper hardness of coating and its strong bond to the metal surface before the leaves are clamped together.

Further objects and advantages of the present invention will be apparent from the following description, reference being had to the accompanying drawings, wherein a preferred embodiment of one form of the present invention is clearly shown.

In the drawings:

Fig. 1 is a side elevation of an automobile leaf spring made according to this invention.

Fig. 2 is a plan view thereof.

Fig. 3 is a section on line 3—3 of Fig. 1.

Fig. 4 is a section on line 4—4 of Fig. 1.

Fig. 5 is a cross section through a modified form of the invention and shows every alternate leaf encased in a sheath of lubricant coating.

Fig. 6 is similar to Fig. 5 but illustrates a further modification wherein only the friction surfaces of the spring leaves are coated with the adhering lubricating coating of this invention.

Figs. 7 and 8 are end elevation and longitudinal section respectively, of an ordinary metal bearing bushing having the solid lubricating coating of this invention applied to the friction surface thereof.

Similar reference characters refer to similar parts throughout the several views.

Numeral 10 designates as a whole a multiple leaf spring of any well-known general construction. In the form illustrated, a seven leaf semi-elliptic spring is shown with a spring eye 11 rolled in each end of the long leaf thereof. The spring leaves are clamped together by a central through-bolt 15 and are further retained in alignment by the spring clips 12 and 13 which permit relative longitudinal sliding therebetween when the spring is flexed. The assembled spring 10 may be secured to the front axle 14 (partially shown in dotted lines in Fig. 1) by any suitable means, such as by the customary U-bolts (not shown) which extend around the central portion of the spring and down through the flange of axle 14. In this form of spring, the central portion is clamped rigid with the front axle 14 by said U-bolts. The construction so far described is well-known.

According to this invention the spring leaves are individually coated with the hard flexible permanent lubricant coating of this invention prior to their assembling to form a complete spring. To provide this coating each leaf is preferably dipped into the coating compound when in a viscous fluid state, and thereafter the coating is hardened by drying or baking at a suitable temperature according to the ingredients of the compound used. If it is desired to increase the thickness of the coating on the leaves, each leaf may be dipped into the compound twice, or several times, until the desired thickness is built up. Preferably the compound is made sufficiently fluid to flow evenly over the spring leaf upon its removal after the dipping operation for the purpose of providing in a simple manner a smooth bearing area after the coating sets up. If necessary or desired in any case, the coating may be smoothed down mechanically while still soft and plastic. With some compounds the coating may be more conveniently applied by spraying, by brushing, or by some other suitable method.

The coating compound is preferably formed by dissolving cellulose nitrate having a suitable plasticizer incorporated therein in a suitable solvent, such as acetone, amyl acetate, or an equivalent solvent. Camphor is a suitable plasticizer for cellulose nitrate. Other plasticizing agents which may be used with cellulose nitrate are dibutyl phthalate and tri-cresyl phosphate. If celluloid is used instead of cellulose nitrate no further plasticizing material need be added since celluloid ordinarily contains camphor in sufficient quantity for the uses of this invention. Also it may be desirable to add a suitable flexibilizing agent to the compound in order that the finished hard coating on the spring leaves will have such flexibility that the spring may be flexed to its maximum extent without cracking the coating or causing it to buckle and separate from the spring leaf covered thereby. Flexibilizing agents which may be used with the cellulose nitrate compound are non-drying vegetable oils and blown oils, such as blown cottonseed oil, blown castor oil, etc. The best percentage of plasticizer and/or flexibilizing agent to be added to the compound may be easily determined by experiment in any given case, the idea being to provide sufficient flexibility but not excessive softness to the finished hard coating. A proper proportion of a finely divided solid lubricant (such as graphite, soapstone, talc, or the like) is then thoroughly mixed with the dissolved cellulose nitrate, or celluloid as the case may be, to give a fluid compound of the desired consistency and desired proportion of cellulose nitrate to solid lubricant. The presently preferred compound comprises amorphous graphite thoroughly mixed with celluloid dissolved in such an amount of acetone as to give the desired fluidity, which has been found to provide an extraordinarily efficient substantially permanent hard flexible lubricating coating for the separate leaves of the main springs of automobiles. The percentage by weight of graphite to celluloid may vary considerably. For ordinary automobile springs, as illustrated, I have found that from 30% to 50% graphite and 70% to 50% celluloid gives good results. Instead of cellulose nitrate, cellulose acetate may be used together with the suitable plasticizing and flexibilizing agents. When cellulose acetate is used, dibutyl phthalate or tri-cresyl phosphate, or mixtures of these, are preferred as the plasticizer in order to give the desired flexibility and prevent brittleness in the finished coating.

The lubricant coating may be fixed to the metal part, such as the spring leaf, by completely surrounding and tightly fitting thereupon as a sheath so that there will be no relative movement between the coating and the metal part covered thereby, even though there may be no strongly adhering bond between the coating and the metal surface. For instance, when a spring leaf is encased with one of the coatings described in the preceding paragraph by the dipping process as described herein, the coating will upon drying shrink tightly upon the metal leaf and thus be very securely fixed thereto even though there may be very little adherence between the contacting surfaces of the coating and metal.

However, if desired in any case, the lubricant coating may be caused to strongly bond to the metal surface by first applying a suitable undercoating to the metal surface, which undercoating will bond both to the metal and to the lubricant coating when it is later applied. The undercoating should be of a material which, when dried, the wet lubricant coating upon its application will attack but slightly, that is, only sufficiently to enable the lubricant coating to take a good hold upon the undercoating and so be firmly bonded thereto when it dries or sets up hard. When a lubricant coating of graphite and cellulose nitrate or cellulose acetate is used, a satisfactory material for the undercoating is black baking enamel, applied by dipping or spraying or by other suitable method, and baked a slightly less degree than usual. Other examples of suitable materials for such undercoating are the well-known commercial primers and surfacers used as undercoatings on automobile bodies which are finished with pigmented cellulose nitrate lacquer or enamel. For instance, a satisfactory undercoating for this invention can be made from a mixture of elastic gum-oil varnish and a drier, either with or without the addition of a pigment such as iron oxide. Preferably this undercoating should be thoroughly dried, such as by baking, prior to the application of the lubricant coating of graphite and cellulose nitrate.

It is to be understood that this invention is not limited to the use of a cellulose material as the matrix for the finely divided solid lubricant, as other materials having somewhat similar properties as applied for this purpose may be used. Other artificial and some so-called natural resins, or resinous substances, may be substituted for the above-described cellulose material. Examples of other materials which may be used to advantage in this application are: (1) rubber which is vulcanized upon the spring leaves to such degree of hardness that the graphited surface thereof provides a good sliding surface and yet not so hard as to crack when the spring is flexed; (2) polymer of chloroprene; (3) polymer of vinyl chloride and vinyl acetate; (4) condensation products of phenol and formaldehyde, such as bakelite, which has had sufficient plasticizer added to provide the necessary flexibility to prevent cracking of the coating when the spring is flexed; (5) glyptal type resins which are defined as the condensation products of the interaction of polyhydric alcohols, monohydric alcohols, mono- and poly-basic acids in various combinations.

After the separate leaves are each coated as described above they are assembled together by means of the bolt 15 and clips 12 and 13 to form the complete spring. Figs. 3 and 4 illustrate an improved form of spring clips 12 and 13 which may be advantageously used with the coated leaves of this invention. These clips are of metal to which pads 20 of soft resilient rubber have been secured, preferably by vulcanization in situ. After clips 12 and 13 have the rubber pads 20 applied thereto, each is riveted to the bottommost leaf at its particular section by means of the rivets 21. These clips are bent over the top leaf of the spring after the leaves are assembled together to clamp the leaves together under the desired yielding pressure caused by upper portions of the rubber pads 20, whereby any desirable increased friction between the spring leaves may be obtained. These rubber pads permit the necessary relative sliding of the leaves upon each other by distortion of the rubber and hence there is little or no relative sliding between the leaves and the rubber. This provides long life in use for the rubber pads. Since the lubricating coating 22 requires no oil or grease to properly lubricate the spring leaves the rubber pads 20 will not be subjected to the deteriorating effects of oil or grease and hence will work efficiently for long periods.

It is preferred to encase each leaf with a sheath of the permanent coating, as illustrated in Figs. 3 and 4, however if desired, only the friction surfaces of the leaves may be so coated to realize the most important advantages of the invention, as shown in Fig. 6. Also if desired, only every alternate leaf may be so coated on both faces thereof, since this will provide a metal against coating contact between all the leaves, as shown in Fig. 5.

The permanent coatings of this invention may be applied to friction surfaces of any parts other than springs for the purpose of providing a substantially permanent hard dry self-lubricating surface. For instance, it may be used in many forms of bearings where the bearing loads and speeds are not excessive, as illustrated in Figs. 7 and 8. After spring leaves coated with this material have been in use for a short time the action of the spring tends to produce a smooth even bearing surface for each leaf which gives a maximum wearing surface and eliminates any rough spots. Thus a very constant coefficient of friction between the leaves is maintained throughout the life of the spring.

While the form of embodiment of the present invention as herein disclosed, constitutes a preferred form, it is to be understood that other forms might be adopted, all coming within the scope of the claims which follow.

What is claimed is as follows:

1. A multiple leaf spring having its individual leaves encased in a tightly fitting dry solid lubricant sheath comprising a mixture of graphite and cellulose nitrate.

2. A multiple leaf spring having the friction surfaces of its leaves coated with a dry solid lubricating coating securely fixed thereto, said coating comprising a mixture of graphite and cellulose nitrate.

3. A multiple leaf spring having the friction surfaces of its leaves coated with a strongly adhering solid coating comprising finely divided graphite substantially uniformly distributed in a matrix of cellulose nitrate.

4. A multiple leaf spring having the friction surfaces of its leaves coated with a strongly adhering solid lubricating coating comprising a finely divided solid lubricant substantially uniformly distributed in cellulose nitrate.

5. In combination, a metallic member having a bearing surface, said bearing surface having a solid wear-resisting lubricating coating securely fixed thereto, said coating comprising a mixture of a finely divided solid lubricant and cellulose nitrate which has a plasticizer incorporated therein, whereby to increase the flexibility of said lubricating coating.

6. In combination, two metallic members arranged to slide upon one another, the contacting surface of one of said metal members having an adhering permanent solid lubricating coating fixed thereto, said coating comprising a mixture of finely divided solid lubricant and cellulose nitrate which has a plasticizer incorporated therein, said plasticizer being selected from the group: comphor, dibutyl phthalate, tri-cresyl phosphate, non-drying vegetable oil.

7. A member having a portion thereof adapted to slidably contact a second member, the contacting surface of said first member having a strongly adhering, wear-resisting lubricating coating bonded thereto by means of a separate undercoating, said lubricating coating comprising a mixture of graphite and cellulose nitrate.

8. A member having a portion thereof adapted to slidably contact a second member, the contacting surface of said first member having a substantially permanent, solid, lubricating coating fixed thereto, said coating comprising a mixture of a solid lubricant and cellulose nitrate which has a plasticizer such as camphor incorporated therein.

9. A member having a bearing surface, said bearing surface having a strongly adhering, wear-resisting solid non-metallic lubricating coating bonded thereto by an undercoating which is bonded both to the metal surface and to the non-metallic lubricating coating.

10. A member having a bearing surface, said bearing surface having a wear-resisting, lubricating sheath fixed thereto, said sheath comprising a mixture of a finely divided solid lubricant and a cellulose ester.

11. A member having a bearing surface, said bearing surface having a relatively thin wear-resisting lubricating sheath fixed thereto by being shrunk thereupon, said sheath comprising a solid lubricant and a solid resinous substance having the general properties of natural or artificial resin.

12. A member having a bearing surface, said bearing surface having an adhering, wear-resisting relatively thin lubricating coating bonded thereto, said coating comprising a mixture of a finely divided solid lubricant and a solid resinous substance.

13. A member having a bearing surface, said bearing surface having an adhering, wear-resisting lubricating coating bonded thereto, said coating comprising a solid lubricant and a matrix therefor selected from the following group: cellulose ester, polymer of vinyl chloride and vinyl acetate, polymer of chloroprene, glyptal resin.

14. A member having a bearing surface, said bearing surface having an adhering, wear-resisting lubricating coating bonded thereto, said coating comprising, a solid lubricant and a polymerization artificial resin.

15. A member having a bearing surface, said bearing surface having an adhering, wear-resisting lubricating coating bonded thereto, said coating comprising a solid lubricant and a condensation artificial resin.

16. A member having a bearing surface, said bearing surface having an adhering, wear-resisting lubricating coating bonded thereto, said coating comprising a solid lubricant and a condensation glyptal type resin.

17. A member having a bearing surface, said bearing surface having an adhering, wear-resisting lubricating coating bonded thereto, said coating comprising a finely divided solid lubricant and an artificial resin selected from the following group: phenol-formaldehyde resins, glyptal resins, vinyl resins.

18. A member having a bearing surface, said bearing surface having an adhering, hard, wear-resisting lubricating coating bonded thereto, said coating comprising a finely divided solid lubricant distributed within a mass of vulcanized hard rubber.

HARVEY D. GEYER.